United States Patent

Reimer et al.

Patent Number: 5,386,166
Date of Patent: Jan. 31, 1995

[54] MAGNETIC BEARING CELL

[75] Inventors: Peter Reimer, Hürth; Helmut Schneider, Zülpich; Johan K. Fremerey, Bonn, all of Germany

[73] Assignee: Leybold AG, Germany

[21] Appl. No.: 108,561

[22] PCT Filed: Feb. 13, 1992

[86] PCT No.: PCT/EP92/00314
§ 371 Date: Oct. 28, 1993
§ 102(e) Date: Oct. 28, 1993

[87] PCT Pub. No.: WO92/15795
PCT Pub. Date: Sep. 17, 1992

[30] Foreign Application Priority Data

Feb. 27, 1991 [DE] Germany .............. 4106063

[51] Int. Cl.⁶ .................................. H02K 7/09
[52] U.S. Cl. ............................................ 310/90.5
[58] Field of Search ............ 310/90.5, 51, 156, 254, 310/261, 268

[56] References Cited

U.S. PATENT DOCUMENTS 2,582,788  1/1952  Mendeson ............... 310/90.5
3,865,442  2/1975  Studer .................... 310/90.5

FOREIGN PATENT DOCUMENTS 0155624  8/1985  European Pat. Off. .
0332979  3/1989  European Pat. Off. .
1273897  9/1961  France ...................... 310/90.5
2127772  9/1972  France .
2136371  2/1973  Germany ................. 310/90.5
2825551  12/1979 Germany ................. 310/90.5
3409047  9/1985  Germany .
1133636  1/1985  U.S.S.R. ................. 310/90.5

Primary Examiner—R. Skudy
Attorney, Agent, or Firm—Harris Beach & Wilcox

[57] ABSTRACT

There is disclosed a magnetic bearing cell of rotationally symmetrical construction, which includes a rotor having two rotating permanent ring magnets and a stator having a damping disk that projects into a first gap between the permanent ring magnets of the rotor. In order to improve the radial stability of the cell an additional permanent ring magnet is secured to the shaft and is spaced apart from one of the rotating permanent ring magnets to define a second gap therebetween. A ring disk that is secured to the stator projects into the second gap, the ring disk carrying an axially magnetized stator permanent ring magnet in the vicinity of the rotating permanent ring magnets of the rotor.

6 Claims, 1 Drawing Sheet

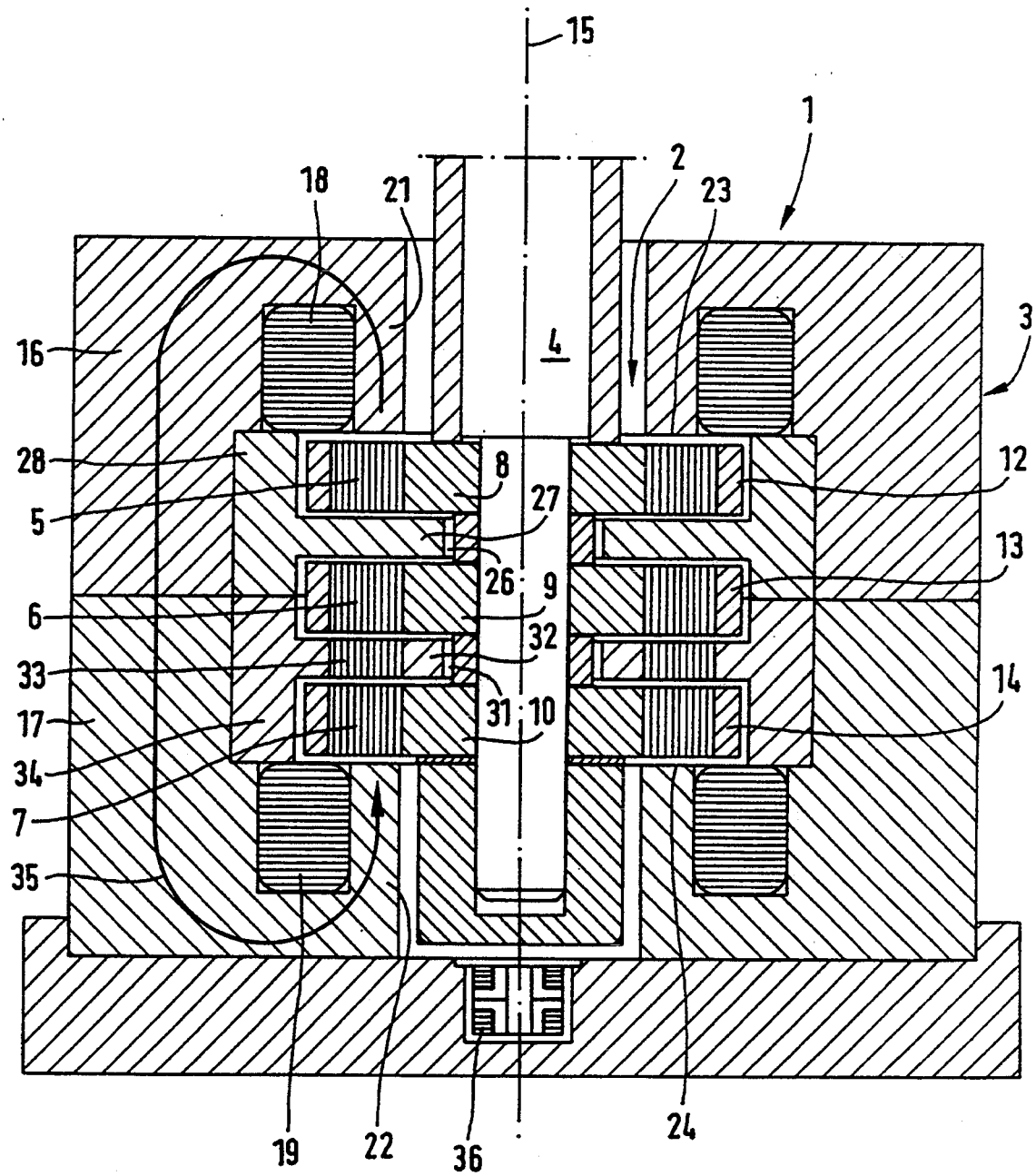

MAGNETIC BEARING CELL

The present invention relates to a magnetic bearing cell that is constructed so as to be rotationally symmetrical, this having a rotor that is arranged so as to be rotatable about the central axis of the cell, and incorporating a shaft and two axially magnetized permanent ring magnets that are secured to the shaft so as to be separated axially, as well as a stator that incorporates two annular coils, pole elements, and an annular disk of non-magnetizable material that is highly conductive electrically, said disk extending into the gap between the permanent magnets of the rotor; the components of the rotor and of the stator are so arranged relative to each other that a magnetic flux that surrounds the central axis toroidally is generated.

Magnetic bearing cells of this kind, such as are described in DE-PS 34 09 047, have proved themselves in practice. Because of the fact that the magnetic flux of a single magnetic circuit is used for axial stabilization, for radial centering, and for damping, these magnetic bearing cells have good damping properties as well as relatively good positional characteristics in addition to a simple construction.

Axial and radial stability (rigidity) are important for the positional characteristics of magnetic bearings. Magnetic bearings of the type referred to here are unstable in the axial direction. For this reason, active axial control is necessary. This is effected with the help of ring coils, an axial sensor, and appropriate electronic controllers.

Radial rigidity depends substantially on the strength of the magnetic flux. This is limited because of structural constraints, since the gap between the permanent ring magnets of the rotor, which have to accommodate the ring disk that damps the bearing, is relatively large and thus forms a relatively large magnetic flux resistance. In a magnetic bearing cell of the type discussed herein, an improvement of radial rigidity could be achieved were the magnetic flux generated by the two permanent ring magnets to have a greater effect. However, this would make a substantial enlargement of both the components that generate the magnetic flux and the components that conduct the flux necessary. In the case of rapidly rotating rotors, for which magnetic bearings are particularly well suited, would make additional measures to overcome centrifugal forces necessary. Furthermore, any additional heat that resulted would have to be eliminated.

It is the task of the present invention to bring about a substantial improvement of the radial rigidity of a magnetic bearing cell of the type described in the introduction hereto without the need for any costly measures.

This problem has been solved according to the present invention in that an additional permanent ring magnet is secured to the shaft and arranged between the pole elements of the stator; in that the additional permanent ring magnet forms a gap with the adjacent permanent ring magnet; and that a ring disk that is secured to the stator projects into this gap, this disk carrying, in the vicinity of the rotating permanent ring magnets of the rotor, an axially magnetized stator permanent ring magnet. In a magnetic bearing cell of this type, the additional rotor permanent ring magnet and the additional stator permanent ring magnet are components of the single magnetic circuit that surrounds the axis toroidally, as was previously the case. The gap between the stator permanent ring magnet and the adjacent rotor permanent ring magnets can be kept very small, so that a substantial improvement (by a factor of greater than 4) of the radial rigidity is achieved. In comparison to formerly known magnetic bearing cells, the magnetic bearing cell according to the present invention is somewhat greater only in the axial direction. No additional problems associated with centrifugal force occur.

Additional advantages and details of the present invention are described in greater detail below on the basis of an embodiment that is shown in the drawing appended hereto.

The magnetic bearing cell 1 that is shown in the drawing includes the rotor 2 and the stator 3.

The components of the rotor 2 are the shaft 4 and the permanent ring magnets 5, 6, and 7 that are secured to the shaft 4. Inner hub rings 8, 9, and 10 and outer reinforcing rings 12, 13, and 14, that can be cemented to each other, for example, are also fitted in order to secure the permanent ring magnets 5 to 7 to the shaft 4.

The stator 3 includes pole elements 16, 17, which have a common cross-section that is essentially C-shaped and are formed so as to be rotationally symmetrical with reference to the central axis 15. The ring coils 18, 19 are located in the face area of the C. The internal cross-sections of pole elements 21, 22 form the pole surfaces 23, 24 that are proximate to the permanent ring magnets 5 to 7 of the rotor 2.

The ring disk 27 that is of a non-magnetizable material of high electrical conductivity, for example copper, fits into the gap 26 between the permanent ring magnets 5 and 6. Peripherally, the ring disk 27 incorporates a cylindrical sector 28 that lies against the element 16 from the inside. During essentially axially oriented relative movements, eddy currents are generated in the ring disk 27 and also in the cylindrical sector 28, and these have the desired damping effect. The cylindrical sector 28 has a centering function and also makes it possible to remove the heat that is generated by the eddy currents.

A ring disk 32 projects into the gap 31 between the permanent ring magnets 6 and 7 and this carries a permanent ring magnet 33. The radial dimensions of this stator permanent ring magnet 33 correspond to the dimensions of the rotor permanent ring magnets 6 and 7. For the remainder, the disk 32 is of non-magnetizable material, and similarly incorporates the cylindrical sector 34 around its periphery, which lies against the elements 17 on the inside in order to provide for centering. If, in addition, the material is of high electrical conductivity, it will then contribute to improving the damping characteristics.

The magnets 5, 6, 33, and 7 are magnetized in the axial direction such that they exert attractive forces on each other. Together with the pole elements 16 (21) and 17 (22), they form a magnetic circuit (arrow 35) that includes the ring coils 18, 19 and surrounds the central axis 15 toroidally. Active axial control is effected in the known manner with the help of the coils 9, and axial sensor 36, and a regulator (not shown herein). The distances between the permanent magnets 6 and 33 or 33 and respectively, can be kept smaller, so that a high level of radial rigidity is achieved. Because of the fact that the magnetic flux also passes through the disk 27, in addition to the positional properties that have been greatly improved vis-a-vis the prior art, the magnetic bearing cell according to the present invention also has good damping characteristics, as was previously the case.

We claim:

1. A magnetic bearing cell that is rotationally symmetric about a central axis, comprising:
   a rotor for rotation about said central axis, said rotor having a shaft and two axially magnetized permanent ring magnets that are secured to the shaft for rotation therewith and axially separated from one another to define a first gap therebetween;
   a stator having two ring coils, pole elements, and a first ring disk, said first ring disk being fabricated of a non-magnetizable material having high electrical conductivity, said first ring disk projecting into said first gap of said rotor;
   structural elements of said rotor and said stator being disposed relative to one another to generate a toroidal magnetic flux that surrounds said central axis;
   a further permanent ring magnet disposed between said pole elements of said stator and secured to said shaft, and separated from said two axially magnetized permanent ring magnets by a second gap;
   a second ring disk secured to said stator that projects into said second gap said second ring disk carrying an axially magnetized stator permanent ring magnet that is disposed in a vicinity of said two axially magnetized permanent ring magnets.

2. The magnetic bearing cell according to claim 1, wherein said second ring disk comprises a nonmagnetizable carrier material.

3. The magnetic bearing cell according to claim 2, wherein said carrier material has a high level of electrical conductivity.

4. The magnetic bearing cell according to claim 3, wherein said carrier material is copper.

5. The magnetic bearing cell according to claim 1, wherein said first ring disk and said second ring disk each have peripheral cylindrical portions that lie against an interior surface of a said pole element.

6. The magnetic bearing cell according to claim 1, wherein said two axially magnetized permanent ring magnets, said further permanent ring magnet, and said stator permanent ring magnet are all disposed substantially in a common cylindrical surface of revolution that is coaxial with said central axis.

* * * * *